(12) United States Patent
Yamamori et al.

(10) Patent No.: US 7,045,560 B2
(45) Date of Patent: *May 16, 2006

(54) ANTIFOULING COATING

(75) Inventors: Naoki Yamamori, Kyotanabe (JP); Satoshi Okamoto, Ibaraki (JP); Kiyoaki Higo, Ikoma (JP); Masayuki Matsuda, Osaka (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/638,305

(22) Filed: Aug. 12, 2003

(65) Prior Publication Data

US 2004/0029997 A1 Feb. 12, 2004

Related U.S. Application Data

(63) Continuation of application No. 09/818,733, filed on Mar. 28, 2001, now abandoned.

(30) Foreign Application Priority Data

| Mar. 28, 2000 | (JP) | ............................. 2000-088292 |
| Nov. 1, 2000 | (JP) | ............................. 2000-334417 |
| Feb. 21, 2001 | (JP) | ............................. 2001-045740 |

(51) Int. Cl.
*C09J 4/02* (2006.01)
*C09D 5/16* (2006.01)

(52) U.S. Cl. ................... 523/177; 523/122; 525/330.6; 525/386; 106/14.13; 106/14.36

(58) Field of Classification Search ................ 523/177, 523/122; 525/330.6, 386; 106/14.13, 14.36
See application file for complete search history.

(56) References Cited

U.S. PATENT DOCUMENTS

| 4,774,080 A | 9/1988 | Yamamori et al. |
| 4,918,147 A | 4/1990 | Yamamori et al. |
| 5,080,892 A | 1/1992 | Yamamori et al. |
| 5,116,407 A | 5/1992 | Hunter et al. |
| 5,199,977 A | 4/1993 | Yamamori et al. |
| 5,298,569 A | 3/1994 | Yamamori et al. |
| 5,631,308 A | 5/1997 | Ryu et al. |
| 5,880,173 A | 3/1999 | Matsuda et al. |
| 6,248,806 B1 | 6/2001 | Codolar et al. |
| 2004/0105837 A1* | 6/2004 | Higo et al. |

FOREIGN PATENT DOCUMENTS

| EP | 0 204 456 A1 | 12/1986 |
| EP | 0 342 276 A1 | 11/1989 |
| EP | 0779 304 A1 | 6/1997 |
| JP | 2000-109295/10 | 3/1998 |
| JP | 11323208 A | 3/1998 |
| JP | 11-323207 | 11/1999 |
| WO | WO 91/15546 | 10/1991 |

OTHER PUBLICATIONS

Römpp Lexikon Chemie, 10th Edition, vol. 4, 1998, pp. 2807-2808.
Römpp Lexikon Chemie, Georg Thieme Verlag Stuttgart, 9th Edition, 1990, pp. 8, 1737, 1738, 2432, 2880, and 3201.
Hawley's Condensed Chemical Dictionary, 11th Edition, 1987, p. 1.

* cited by examiner

*Primary Examiner*—Tae H. Yoon
(74) *Attorney, Agent, or Firm*—Connolly, Bove, Lodge & Hutz, LLP

(57) ABSTRACT

An antifouling coating
which comprises a varnish comprised of a metal-containing acrylic resin having, in a side chain thereof, at least one group represented by the following formula (1):

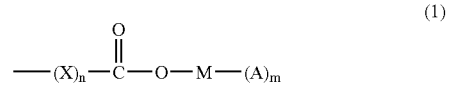

wherein X represents a group of the formula:

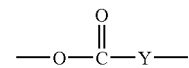

n represents 0 or 1; Y represents a hydrocarbon group; M represents a metal; m represents an integer equal to [(the valence number of metal M)-1]; A represents an organic acid residue derived from a monobasic acid,
said varnish having a nonvolatile fraction of not less than 40 weight % and a viscosity at 25° C. of not more than 18 poises
and said antifouling coating having a volatile organic compound (VOC) content of not more than 400 g/L.

8 Claims, No Drawings

ANTIFOULING COATING

REFERENCE TO RELATED APPLICATION

This is a continuation of application Ser. No. 09/818,733, filed Mar. 28, 2001 now abandoned.

TECHNICAL FIELD

The present invention relates to an antifouling coating comprising a metal-containing acrylic resin.

BACKGROUND ART

Ships, fishnets and other underwater structures or equipment tend to attract aquatic organisms such as barnacles, mussels, and algae which interfere with an efficient operation of ships and cause a waste of fuels in ships or cause clogging and shorten the service life of fishnets. To prevent such attachment of life to underwater structures, it is common practice to coat the surfaces of the structures with an antifouling coating. As a representative antifouling coating heretofore in use, there is a matrix type antifouling coating comprising a formulation of a rosin and a vinyl or alkyd resin which is insoluble in seawater. However, since a coating of this type releases an antifoulant ingredient together with the rosin into the seawater, a long-term stable antifouling effect cannot be expected and, moreover, since the insoluble resin remaining in the coating film forms a skeletal structure, the coating has the disadvantage that particularly when it is applied to ships, the resistance between the seawater and the coated surface is increased to slow down the speed of ships.

In recent years, in view of the long-term antifouling effect and other advantages, hydrolyzable antifouling coatings have been utilized widely and, as one variation, a coating comprising a metal-containing resin composition has been developed. Metal-containing resins in which a pendant acidic group and a monobasic organic acid form a salt with a metal atom and methods for producing the resins have been described in the patent applications filed by the present applicant, inter alia, Japanese Kokai Publication Sho-62-101653, Japanese Kokai Publication Sho-63-128008, Japanese Kokai Publication Sho-63-128084 and Japanese Kokai Publication Hei-08-73536. When a resin of this kind is used in an antifouling coating, the resin is gradually hydrolyzed in seawater to release the antifoulant metal ion and, at the same time, the resin itself is solubilized and eluted out to exhibit a self-polishing effect.

DISCLOSURE OF THE INVENTION

It is an object of the present invention to provide a high-solid antifouling coating having excellent antifouling performance and coating film characteristics and meeting not only ecological needs but also the need for conservation of resources.

It is a further object of the invention to provide an antifouling coating having long-term antifouling performance and coating film characteristics, particularly high crack resistance.

The present invention relates, in a first aspect of thereof, to an antifouling coating which comprises a varnish comprised of a metal-containing acrylic resin having, in a side chain thereof, at least one group represented by the following formula (1):

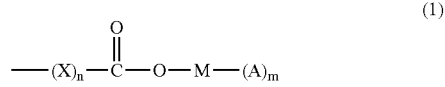

wherein X represents a group of the formula:

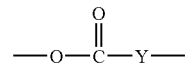

n represents 0 or 1; Y represents a hydrocarbon group; M represents a metal; m represents an integer equal to [(the valence number of metal M)-1]; A represents an organic acid residue derived from a monobasic acid, said varnish having a nonvolatile fraction of not less than 40 weight % and a viscosity at 25° C. of not more than 18 poises and said antifouling coating having a volatile organic compound (VOC) content of not more than 400 g/L.

The present invention relates, in a second aspect thereof, to an antifouling coating which comprises a metal-containing acrylic resin having, in a side chain thereof, at least one group represented by the following formula (1):

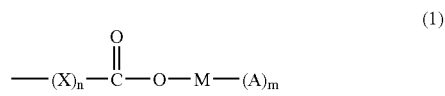

wherein X represents a group of the formula:

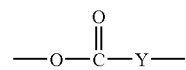

n represents 0 or 1; Y represents a hydrocarbon group; M represents a metal; m represents an integer equal to [(the valence number of metal M)-1]; A represents an organic acid residue derived from a monobasic acid), with 5 to 100 mole % of said organic acid residue derived fromamonobasic acidbeing the residue of a cyclic organic acid.

DISCLOSURE OF THE INVENTION

The present invention is now described in detail.

The antifouling coating according to the first aspect of the invention has a volatile organic compound (VOC) content of not more than 400 g/L. When the VOC value exceeds 400 g/L, the coating may not be subsumed in the concept of a high-solid coating and, from ecological points of view, may exert adverse influences. The preferred VOC value is not more than 350 g/L.

The antifouling coating according to the first aspect of the invention comprises a metal-containing acrylic resin varnish.

In the first aspect of the invention, in order that the VOC value of the antifouling coating may be controlled down to 400 g/L or less, it is necessary to use, as said metal-containing acrylic resin varnish, one having a nonvolatile fraction of not less than 40 weight % and a viscosity at 25° C. of not more than 18 poises. When the nonvolatile fraction is less than 40 weight %, a high-solid coating cannot be obtained. When the nonvolatile fraction is not less than 40 weight % and, at the same time, the viscosity at 25° C. exceeds 18 poises, handlability and workability are poor and the viscosity is so high as to necessitate dilution with an organic solvent in preparing an antifouling coating to fail to provide a high-solid coating.

The metal-containing acrylic resin in said metal-containing acrylic resin varnish has at least one group represented by the above formula (1) in a side chain thereof. The metal-containing acrylic resin can be easily produced by any of the following methods. Thus, there can be mentioned (1) the method which comprises polymerizing an unsaturated organic acid monomer and an additional unsaturated monomer and either reacting the resulting acrylic resin with a metal compound and a monobasic acid or reacting said acrylic resin with a metal salt of amonobasic acid or (2) the method which comprises either reacting an unsaturated organic acid monomer with a metal compound and a monobasic acid or reacting an unsaturated organic acid monomer with a metal salt of a monobasic acid and polymerizing the resulting metal-containing unsaturated monomer with another unsaturated monomer. In consideration of the rate of introduction of said monobasic acid metal salt and the yield of the resulting metal-containing acrylic resin, the first-mentioned method (1) comprising polymerizing an unsaturated organic acid monomer and another unsaturated monomer to prepare an acrylic resin and either reacting this acrylic resin with a metal compound and a monobasic acid or reacting said acrylic resin with a monobasic acid metal salt is preferred.

The metal-containing acrylic resin can also be produced by the method disclosed in Japanese Kokai Publication Sho-63-128008 which comprises using, as said metal compound, a metal salt of a low-boiling organic basic acid boiling at a temperature below the boiling point of said monobasic acid by not less than 20° C. and between 100° C. and 240° C. and reacting said metal salt of a low-boiling organic basic acid, said acrylic resin and said monobasic acid together under heating with said low-boiling organic basic acid being removed from the system.

Referring to the above formula (1), Y is not particularly restricted as far as it is a hydrocarbon group and may for example be the residue of the adduct of a dibasic acid, such as phthalic acid, succinic acid and maleic acid, to an unsaturated organic acid monomer. Thus, in the case of the metal-containing acrylic resin corresponding to n=1, X containing said Y can be introduced by adding said dibasic acid to an unsaturated monobasic acid hydroxyalkyl ester and copolymerizing the same to give a resin or by causing said dibasic acid to be present during production of the resin or thereafter.

The unsaturated organic acid monomer mentioned above includes those compounds having at least one carboxyl group, for example unsaturated monobasic acids such as (meth) acrylic acid; unsaturated dibasic acids and monoalkyl esters thereof, such as maleic acid inclusive of its monoalkyl esters and itaconic acid inclusive of its monoalkyl esters; unsaturated monobasic acid hydroxyalkyl ester-dibasic acid adducts, such as 2-hydroxyethyl (meth)acrylate-maleic acid adduct, 2-hydroxyethyl (meth)acrylate-phthalic acid adduct, and 2-hydroxyethyl (meth)acrylate-succinic acid adduct. In this specification, the term (meth)acrylic acid is used to mean whichever of methacrylic acid and acrylic acid.

As said additional unsaturated monomer, there can be mentioned various esters of (meth)acrylic acid, e.g. alkyl (meth)acrylates, the ester moieties of which contain 1 to 20 carbon atoms, such as methyl (meth)acrylate, ethyl (meth) acrylate, i-propyl (meth)acrylate, n-butyl (meth)acrylate, i-butyl (meth)acrylate, t-butyl (meth)acrylate, 2-ethylhexyl (meth)acrylate, lauryl (meth) acrylate and stearyl (meth) acrylate; hydroxy-containing alkyl (meth)acrylates, the ester moieties of which contain 1~20 carbon atoms, such as 2-hydroxypropyl (meth)arylate and 2-hydroxyethyl (meth) acrylate; cyclic hydrocarbon esters of (meth)acrylic acid, such as phenyl (meth)acrylate and cyclohexyl (meth)acrylate; polyalkylene glycol esters of (meth)acrylic acid, such as polyethylene glycol mono (meth) acrylate and polyethylene glycol mono (meth) acrylate with a degree of polymerization in the range of 2 to 10; $C_{1-3}$ alkoxyalkyl (meth) acrylate; etc.; (meth)acrylamide; vinyl compounds such as styrene, α-methylstyrene, vinyl acetate, vinyl propionate, vinyl benzoate, vinyltoluene and acrylonitrile; esters of crotonic acid; and diesters of unsaturated dibasic acids, such as maleic acid diesters and itaconic acid diesters. Of the above-mentioned esters of (meth)acrylic acid, the ester moieties are preferably alkyl groups containing 1 to 8 carbon atoms, more preferably an alkyl groups containing 1 to 6 carbon atoms. The preferred specific compounds are methyl (meth)acrylate, ethyl (meth)acrylate, butyl (meth)acrylate and cyclohexyl (meth)acrylate.

The above-mentioned unsaturated organic acid monomers and other unsaturated monomers may respectively be used alone or in a combination of two or more species.

The acrylic resin constituting said metal-containing acrylic resin, that is to say the acrylic resin obtainable by polymerizing said unsaturated organic acid monomer with said other unsaturated monomer preferably has an acid value of 80 to 300 mg KOH/g. If the acid value is less than 80 mg KOH/g, the amount of metal salt to be attached to the side chain is decreased to detract from antifouling activity in certain case. If it exceeds 300 mg KOH/g, the elution rate is so high that no long-term antifouling effect may be expected and, in addition, the viscosity of the resulting metal-containing acrylic resin varnish will be increased too much to give a high-solid coating. More preferred acid value range is 100 to 250 mg KOH/g.

The glass transition temperature of the acrylic resin constituting said metal-containing acrylic resin is preferably not higher than 5° C. If it is over 5° C., the viscosity of the resulting metal-containing acrylic resin varnish will be increased too much to give a high-solid antifouling coating in certain instances. Both the above acid value and the above glass transition temperature are design parameter values and can be calculated from the monomer composition.

The kinds and formulating amounts of said unsaturated organic acid monomer and the above other unsaturated monomer can be so chosen that the acid-value and glass transition temperature of the acrylic resin resulting from the monomers will fall within the above-defined respective ranges. In regard to said unsaturated organic acid monomer and other unsaturated monomer, it is preferable to use acrylic acid or its derivative as a predominant component. The predominant component mentioned above means that acrylic acid or its derivative accounts for not less than 60 weight %, preferably not less than 80 weight %, more preferably not less than 90 weight %, of the total weight of said unsaturated organic acid monomer and other unsaturated monomer.

The metal compound mentioned above is not particularly restricted but includes metal oxides, metal hydroxides, metal chlorides, metal sulfides, basic metal carbonates and metal salts of said low-boiling organic basic acids, among others. These metal compounds may be used singly or in a combination of two or more species. The metals of said metal compounds can be selected from among the elements belonging to the groups 3A to 7A, 8 and 1B to 7B of the periodic table of the elements. Particularly preferred are divalent metals, with copper and zinc being more preferred.

The metal is preferably contained in a proportion of 0.3 to 20 weight % based on the nonvolatile matter of said acrylic resin. At an amount below 0.3 weight %, the hydrolysis of the metal salt moiety in the resin results only in a very slow rate of elution. At an amount over 20 weight %, the rate of elution is undesirably too high. Thus, both extremes are unfavorable. More preferred range is 0.5 to 15 weight %.

The monobasic acid mentioned above is preferably a bulky monobasic acid and its acid value is preferably less than 200 mg KOH/g, more preferably not more than 190 mg KOH/g. If the acid value is 200 mg KOH/g or larger, a high-solid antifouling coating may not be obtained. As far as the acid value is less than 200 mg KOH/g, the monobasic acid is not particularly restricted but from the standpoint of long-term antifouling effect and crack resistance, it is preferred to use a monobasic cyclic organic acid. The monobasic cyclic organic acid mentioned just above is not particularly restricted but may for example be one having a cycloalkyl moiety, such as naphthenic acid. Furthermore, resin acids such as tricyclic resin acids and salts thereof are preferred. The tricyclic resin acids are not particularly restricted but include monobasic acids having a diterpenoid hydrocarbon skeleton, among others. As specific compounds, there can be mentioned compounds having an abietane, pimarane, isopimarane or labdane skeleton, such as, for example, abietic acid, neoabietic acid, dehydroabietic acid, hydrogenated abietic acid, palustric acid, pimaric acid, isopimaric acid, levopimaric acid, dextropimaric acid, sandaracopimaric acid and so forth. Among these, abietic acid, hydrogenated abietic acid, and their salts are preferred in view of the adequate hydrolyzability and consequent long-term antifouling effect, high crack resistance of the obtained coating film, and availability.

The monobasic cyclic organic acid need not have been highly purified but, for example, pine resin, pine resin acid or the like can be employed. As specific examples, rosins, hydrogenated rosins, partial rosins, disproportionated rosins, etc. can be mentioned. The rosins mentioned above include gum rosin, wood rosin, tall oil rosin, and so forth. The rosins, hydrogenated rosins, partial rosins and disproportionated rosins are inexpensive, readily available, easy to work with, and desirable in terms of long-term antifouling effect.

The above monobasic acid can be used singly or in a combination of two or more different ones.

The metal salt of said monobasic acid may for example be prepared by reacting said metal compound with said monobasic acid in advance.

The reaction for production of said metal-containing acrylic resin can be carried out by the known method but the heating, agitation and other procedures are preferably carried out at temperatures below the decomposition temperature of the metal salt. The ratio of said monobasic acid to the acrylic resin for constituting the metal-containing acrylic resin, that is to say the acrylic resin prepared by polymerizing said unsaturated organic acid monomer and other unsaturated monomer, is preferably 0.9/1.1 through 1.2/0.8 by weight on a nonvolatile mater basis. If the formulating ratio of the above monobasic acid is less than the above range, an inter-molecular metal ester bonding may take place to induce an increase in viscosity or gelation. If the above range is exceeded, no commensurate increase in effect may be expected so that the practice is uneconomical.

With regard to said method (2) for producing the metal-containing acrylic resin, the weight of the acrylic resin on a nonvolatile matter basis means the total weight of the unsaturated organic acid monomer and other unsaturated monomer.

The metal-containing acrylic resin preferably has an average degree of polymerization in the range of 20 to 60. When the polymerization degree is less than 20, the film-forming properties are insufficient so that cracks and peeling may take place in certain instances. When it exceeds 60, the varnish is increased in viscosity so that no high-solid antifouling coating can be obtained at times.

The average degree of polymerization mentioned above can be found from the polystyrene equivalent number average molecular weight value determined by gel permeation chromatography with reference to the degree of polymerization of polystyrene.

To the metal-containing acrylic resin can be added the conventional additives inclusive of an antifoulant to provide an antifouling coating. This antifouling coating is a hydrolyzable antifouling coating having self-polishing properties.

The second aspect of the invention is directed to an antifouling coating comprising a metal-containing acrylic resin having at least one group of the above formula (1) in a side chain thereof in which 5 to 100 mole % of said organic acid residue derived from a monobasic acid is the residue of a cyclic organic acid. The preferred percentage is 15 to 100 mole % and the more preferred percentage is 25 to 100 mole %. If the percentage is less than 5 mole %, no reconciliation may be made between long-term antifouling performance and crack resistance. As the monobasic cyclic organic acid, there can be used the compounds mentioned hereinbefore. The acid value of said monobasic cyclic organic acid is preferably 120 to 190 mg KOH/g. Within this range, the hydrolysis of the acrylic resin according to the invention takes place at a suitable rate to insure a long-term antifouling effect. More preferred acid value is 140 to 185 mg KOH/g.

Among the monobasic organic acids which can be used in the second invention, those other than said monobasic cyclic organic acids include organic acids containing 1 to 20 carbon atoms, suchasaceticacid, propionic acid, butyricacid, lauric acid, stearic acid, linoleic acid, oleic acid, chloroacetic acid, fluoroacetic acid, valeric acid and so forth.

For insuring a high degree of antifouling activity, the acid value of the acrylic resin constituting said metal-containing acrylic resin to be used in the second invention, that is the acrylic resin obtained by polymerizing said unsaturated organic acid monomer and other unsaturated monomer, is preferably in the range of 100 to 250 mg KOH/g. It is to be understood that, in the second aspect of the invention, the glass transition point of said acrylic resin is not particularly restricted.

The raw materials for the metal-containing acrylic resin having at least one group of formula (1) for use in the second invention, namely said unsaturated organic acid monomer, other unsaturated monomer and metal compound, as well as the method of producing the resin can all be the same as those described hereinabove by way of example.

In the second invention, the average degree of polymerization of the metal-containing acrylic resin so prepared is preferably in the range of 20 to 1000, particularly 30 to 400.

This range should be required in order to strike a balance among film-forming properties, workability, and the rate of elution.

To the above metal-containing acrylic resin can be added the conventional additives inclusive of an antifoulant to give an antifouling coating. This antifouling coating is also a hydrolyzable antifouling coating having self-polishing properties.

For adjusting the physical properties and attrition rate of the coating film, one or more other binder resins in addition to said metal-containing acrylic resin can be formulated in the antifouling coatings according to the first and second aspects of the invention. The formulating amount of such other binder resin or resins is preferably within the range of [metal-containing acrylic resin]/[other binder resin(s)] =100/0 to 30/70 by weight on a nonvolatile matter basis relative to the metal-containing organic resin. If the amount of said other binder resin exceeds the above ratio, no reconciliation may be obtained between long-term antifouling performance of the coating film and crack resistance thereof. As examples of said other binder resins, there can be mentioned chlorinated paraffin, poly(vinyl ether), poly(propylene sebacate), partially hydrogenated terphenyl, poly(vinyl acetate), alkyl (meth)acrylate polymers, polyether polyols, alkyd resins, polyester resins, poly(vinyl chloride), silicone oil, waxes, petrolatum, liquid paraffin, rosins, hydrogenated rosins, naphthenic acid, and fatty acids and divalent metal salts thereof, among others.

In the first aspect of the invention, in which a high-solid antifouling coating can be easily obtained, said other binder resin is preferably a solvent-free one with 100 weight % solids. When said other binder contains a solvent, its average degree of polymerization is preferably not more than 60. If it exceeds 60, a high-solid antifouling coating may not be obtained.

In the second aspect of the invention, said other binder resin is not particularly restricted but can be judiciously selected according to the intended use.

In the antifouling coating according to the first and second aspects of the invention, said metal-containing acrylic resin varnish may be formulated with the conventional antifoulant, plasticizer, pigment, solvent and other additives. The antifoulant mentioned above includes various known substances, for example inorganic compounds, metal-containing organic compounds and metal-free organic compounds, and there can be mentioned such specific compounds as copper suboxide, manganese ethylenebisdithiocarbamate, zinc dimethylcarbamate, 2-methylthio-4-t-butylamino-6-cyclopropylamino-s-triazine, 2,4,6-tetrachloroisophthalonirile, N,N-dimethyldicholorophenylurea, zinc ethylenebisdithiocarbamate, copper rhodanate, 4,5-dichloro-2-n-octyl-3(2H)-isothiazolone, N-(fluorodichloromethylthio)phthalimide, N,N'-dimethyl-N'-phenyl-(N-fluorodichloromethylthio)sulfamide, 2-pyridinethiol-1-oxide zinc salt and copper salt, tetramethylthiuram disulfide, 2,4,6-trichlorophenylmaleimide, 2,3,5,6-tetrachloro-4-(methylsulfonyl)pyridine, 3-iodo-2-propylbutyl carbamate, diiodomethyl-p-tolyl sulfone, phenyl(bispyridyl)bismuth dichloride, 2-(4-thiazolyl)-benzimidazole, triphenylboron pyridine salt and so forth. These antifoulants can be used singly or in a combination of two or more species.

The amount of use of said antifoulant is preferably 0.1 to 80 weight % of the total nonvolatile matter of the coating. At an amount below 0.1 weight %, no antifouling effect can be expected. At any amount over 80 weight %, the coating film tends to develop cracks, peeling and other defects. Preferred amount of addition is 1 to 60 weight %.

The plasticizer mentioned above includes phthalic ester plasticizers such as dioctyl phthalate, dimethyl phthalate, dicyclohexyl phthalate, etc.; aliphatic dibasic acid ester plasticizers such as isobutyl adipate, dibutyl sebacate, etc.; glycol ester plasticizers such as diethylene glycol dibenzoate, pentaerythritol alkyl esters, etc.; phosphoric ester plasticizers such as trichloroethylene diphosphate, trichloroethyl phosphate, etc.; epoxy plasticizers such as epoxidized soybean oil, epoxidized octyl stearate, etc.; organotin plasticizers such as dioctyltin laurate, dibutyltin laurate, etc.; trioctyl trimellitate, triacetylene and so on.

The pigment mentioned above includes extender pigments such as precipitated barium, talc, clay, chalk, silica white, alumina white, bentonite, etc.; and colored pigments such as titanium dioxide, zirconium oxide, basic lead sulfate, tin oxide, carbonblack, graphite, red iron oxide, chromium yellow, phthalocyanine green, phthalocyanine blue, quinacridone and so on.

The solvent mentioned above includes various hydrocarbons such as toluene, xylene, ethylbenzene, cyclopentane, octane, heptane, cyclohexane, white spirit, etc.; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether, etc.; esters such as butyl acetate, propyl acetate, benzyl acetate, ethylene glycol monomethyl ether acetate, ethylene glycol monoethyl ether acetate, etc.; ketones such as ethyl isobutyl ketone, methyl isobutyl ketone, etc.; and alcohols such as n-butanol and propyl alcohols.

The other additives which can be used are not particularly restricted but include monobasic acids such as monobutyl phthalate, monooctyl succinate, etc., camphor, castor oil, etc.; water binding agents, antisagging agents; antiflooding agents; antisetting agents; defoamers; and so on.

The antifouling coatings according to the first and second aspects of the invention can be prepared, for example by adding said antifoulant, plasticizer, coating film attrition control agent, pigment, solvent and other conventional additives to the metal-containing acrylic resin varnish and admixing them by means of a mixing machine such as a ball mill, pebble mill, roll mill, sand mill or the like.

The antifouling coating forms a dry film when it is coated on the substrate surface by a conventional technique and the solvent thereof is evaporated off at atmospheric temperature or elevated temperature.

As mentioned above, the antifouling coating according to the first aspect of the invention comprises a metal-containing acrylic resin varnish having a nonvolatile fraction of not less than 40 weight % and a viscosity at 25° C. of not more than 18 poises, with a volatile organic compound (VOC) content of not more than 400 g/L. Such a high-solid antifouling coating can be obtained, for example by satisfying at least one of the following conditions: (1) the average degree of polymerization of said metal-containing acrylic resin is 20 to 60, (2) the acid value and glass transition temperature of the acrylic resin constituting the metal-containing acrylic resin are 80 to 300 mg KOH/g and not higher than 5° C., respectively, and (3) the acid value of the monobasic acid is not more than 200 mg KOH/g. The antifouling coating according to the first aspect of the invention is a high-solid coating which is not only ecofriendly but also excellent in long-term antifouling performance and coating film properties.

Therefore, the antifouling coating according to the first aspect of the invention can be used with advantage in the field of ships and underwater structures where an urgent demand exists for the development of high-solid antifouling coatings and a reconciliation is required between coating film properties and antifouling performance. The antifouling coating according to the first aspect of the invention may be applied to fishnets as well. However, since the antifouling treatment of fishnets is made by the dipping method, conditions different from those applicable to ships and underwater structures must be met with in terms of the degree of attention to be paid to ecology and the physical properties of the coating film.

As mentioned above, the antifouling coating according to the second aspect of the invention comprises a metal-containing acrylic resin in which 5 to 100 mole % of the organic acid residue derived from a monobasic acid is the residue of a cyclic organic acid. The antifouling coating according to the second aspect of the invention can make a reconciliation between long-term antifouling performance and physical properties, particularly crack resistance, of the coating film. Furthermore, the long-term antifouling performance of the coating film can be improved especially by using a cyclic organic acid having an acid value in the range of 120 to 190 mg KOH/g. Therefore, the antifouling coating according to the second aspect of the invention can be applied to ships, fishnets and other underwater structures with great advantage.

The antifouling coating according to the first aspect of the invention is a high-solid coating and, as such, is ecofriendly so that it can be applied to ships and underwater structures with advantage.

The antifouling coating according to the second aspect of the invention shows a long-term antifouling performance and retains an excellent film condition without developing cracks and other defects even under long-term submersion in seawater.

BEST MODE FOR CARRYING OUT THE INVENTION

The following examples are intended to illustrate the instant invention in further detail and should by no means be construed as defining the scope of the invention. In the following, all parts are by weight.

PRODUCTION EXAMPLE 1

Preparation of Acrylic Resin Varnish 1

A separable flask equipped with a stirrer, nitrogen gas inlet pipe and cooling jacket was charged with 70 g of xylene and 20 g of methyl isobutyl ketone and the temperature was controlled at 120° C. Then, 12.5 g of n-butyl acrylate, 68.2 g of ethyl acrylate, 19.3 g of acrylic acid and 2.5 g of t-butyl peroxy-2-ethylhexanoate were added dropwise over 3 hours. After 30 minutes of incubation, 10 g of xylene and 0.3 g of t-butyl peroxy-2-ethylehxanoate were further added dropwise over 30 minutes and the mixture was incubated for 90 minutes to give varnish 1 with a nonvolatile fraction of 50.1 wt. % (number average molecular weight Mn=3500 [average degree of polymerization 35]; solids Tg=−12° C.; solids acid value=150 mg KOH/g).

PRODUCTION EXAMPLE 2

Preparation of Acrylic Resin Varnish 2

A separable flask equipped with a stirrer, nitrogen gas inlet pipe and cooling jacket was charged with 70 g of xylene and 20 g of n-butanol and the temperature was controlled at 120° C. Then, 12 g of cyclohexyl acrylate, 58 g of acrylic acid, 26 g of acrylic acid, 4 g of methoxymethacrylate polyethylene glycol ester (NK ester M-90G, product of Shin Nakamura Chemical Co.) and 3.5 g of α,α'-azobisisobutyronitrile were added dropwise over 3 hours and the mixture was incubated for 30 minutes. Then, 10 g of xylene and 0.3 g of t-butyl peroxy-2-ethylhexanoate were added dropwise over 30 minutes. The mixture was further incubated for 40 minutes to give varnish 2 with a nonvolatile fraction of 50.3 wt. % (Mn=3000 [average degree of polymerization 30]; solids Tg=−24° C., solids acid value=200 mg KOH/g).

PRODUCTION EXAMPLE 3

Preparation of Acrylic Resin Varnish 3

A separable flask equipped with a stirrer, nitrogen gas inlet pipe and cooling jacket was charged with 75 g of xylene and 15 g of n-butanol and the temperature was controlled at 115° C. Then, 49.4 g of ethyl acrylate, 28.3 g of acrylic acid, 8.2 g of methoxyethyl acrylate, 14.1 g of cyclohexyl acrylate and 2.5 g of α,α'-azobisisobutyronitrile were added dropwise over 3 hours and the mixture was incubated for 30 minutes. Then, 10 g of xylene and 0.3 g of t-butyl peroxy-2-ethylhexanoate were added dropwise over 30 minutes. Thereafter, the mixture was incubated for 30 minutes to give varnish 3 with a nonvolatile fraction of 49.7 wt. % (Mn=4500 [average degree of polymerization 45]; solids Tg=−18° C.; solids acid value=220 mg KOH/g).

PRODUCTION EXAMPLE 4

Preparation of Acrylic Resin Varnish 4

A separable flask equipped with a stirrer, nitrogen gas inlet pipe and cooling jacket was charged with 75 g of xylene and 15 g of n-butanol and the temperature was controlled at 115° C. Then, 35 g of methyl methacrylate, 28 g of acrylic acid, 37 g of ethyl acrylate and 2.5 g of α,α'-azobisisobutyronitrile were added dropwise over 3 hours and the mixture was incubated for 30 minutes. Then, 10 g of xylene and 0.3 g of t-butyl peroxy-2-ethylhexanoate were added dropwise over 30 minutes and the mixture was further incubated for 30 minutes to give varnish 4 with a nonvolatile fraction of 49.8 wt. % (Mn=4700 [average degree of polymerization 47]; solids Tg=+40° C.; solids acid value=220 mg KOH/g).

PRODUCTION EXAMPLE 5

Preparation of Acrylic Resin Varnish 5

A separable flask equipped with a stirrer, nitrogen gas inlet pipe and cooling jacket was charged with 50 g of xylene and 15 g of n-butanol and the temperature was controlled at 95° C. Then, 35 g of butyl acrylate, 28 g of acrylic acid, 37 g of ethyl acrylate, and 1.2 g of α,α'-azobisisobutyronitrile were added dropwise over 3 hours and the mixture was incubated for 30 minutes. Then, 10 g of xylene and 0.3 g of t-butyl peroxy-2-ethylhexanoate were added dropwise over 30 minutes and the mixture was further incubated for 90 minutes. Thereafter, 25 g of xylene was further added, whereby varnish 5 with a nonvolatile fraction of 49.8 wt. % (Mn=11000 [average degree of polymerization 110]; solids Tg=−14° C.; solids acid value=220 mg KOH/g) was obtained.

PRODUCTION EXAMPLE 6

Preparation of Metal-containing Acrylic Resin Varnish 6

A separable flask equipped with a stirrer, nitrogen gas inlet pipe, decanter and cooling jacket was charged with 100 g of the varnish 1 produced in Production Example 1, 47 g of WW rosin (acid value 160 mg KOH/g), 26.6 g of copper acetate monohydrate and 120 g of xylene and the temperature was increased to the reflux temperature. While distilling off a mixture of acetic acid, water and solvent and further adding the commensurate amount of xylene, the reaction was conducted for 8 hours and 100 g of the solvent was further distilled off. Then, 10 g of n-butanol and xylene were added so as to adjust the nonvolatile fraction to 50 wt. %. The viscosity of the varnish at 25° C. was 12 poises. This product was designated as varnish 6.

PRODUCTION EXAMPLE 7

Preparation of Metal-containing Acrylic Resin Varnish 7

Using 100 g of varnish 2 obtained in Production Example 2 in lieu of varnish 1, 62 g of hydrogenated rosin (acid value 160 mg KOH/g) in lieu of WW rosin, and copper acetate monohydrate in an amount of 36 g, the procedure of Production Example 6 was otherwise repeated to give varnish 7. Its viscosity at 25° C. was 15 poises.

PRODUCTION EXAMPLE 8

Preparation of Metal-containing Acrylic Resin Varnish 8

Using 100 g of varnish 3 as obtained in Production Example 3 in lieu of varnish 2, 38 g of hydrogenated rosin and 30 g of Yamato Oil and Fat's NA-165 (naphthenic acid; acid value 165 mg KOH/g) in lieu of WW rosin, and 37 g of zinc acetate monohydrate in lieu of copper acetate, the procedure of Production Example 6 was otherwise repeated to give varnish 8. Its viscosity at 25° C. was 17 poises.

PRODUCTION EXAMPLE 9

Preparation of Metal-containing Acrylic Resin Varnish 9

Using 100 g of varnish 4 obtained in Production Example 4 in lieu of varnish 1, together with 68 g of WW rosin, 5 g of Yamato Oil and Fat's NA-200 (acid value 200 mg KOH/g) and 39 g of copper acetate monohydrate, the procedure of Production Example 6 was otherwise repeated and the nonvolatile fraction was adjusted to 40 wt. % to give varnish 9. Its viscosity at 25° C. was 24 poises.

PRODUCTION EXAMPLE 10

Preparation of Metal-containing Acrylic Resin Varnish 10

Using 100 g of varnish 5 obtained in Production Example 5 in lieu of varnish 1, together with 65 g of Yamato Oil and Fat's NA-200 and 39 g of copper acetate monohydrate, the procedure of Production Example 6 was otherwise repeated and the nonvolatile fraction was adjusted to 40 wt. % to give varnish 10. Its viscosity at 25° C. was 26 poises.

PRODUCTION EXAMPLE 11

Preparation of Metal-containing Acrylic Resin Varnish 11

Using 24 g of versatic acid (acid value 320 mg KOH/g) in lieu of WW rosin, the procedure of Production Example 6 was otherwise repeated and the nonvolatile matter concentration was adjusted to 40 wt. % to give varnish 11. Its viscosity at 25° C. was 30 poises.

EXAMPLES 1 TO 6 AND COMPARATIVE EXAMPLES 1 TO 3

Using each of the varnishes 6 to 11 obtained in Production Examples 6 to 11, together with the other components mentioned in Table 1, coatings were produced by blending using High-speed Disper. The viscosity of each coating was adjusted with xylene to 80 to 90 KU to Stormer viscometer (25° C.). With regard to the viscosity of coatings, a coating with a viscosity value of not more than 100 poises could be applied but the preferred viscosity range of 80 to 90 poises was adopted. The VOC value was determined from the solvent content and the specific gravity of the coating. The results are shown in Table 1.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Varnish 6 | 50 |  |  |  |  | 40 |  |  |  |
| Varnish 7 |  | 55 |  |  | 46 |  |  |  |  |
| Varnish 8 |  |  | 60 | 50 |  |  |  |  |  |
| Varnish 9 |  |  |  |  |  |  | 40 |  |  |
| Varnish 10 |  |  |  |  |  |  |  | 36 |  |
| Varnish 11 |  |  |  |  |  |  |  |  | 40 |
| Copper suboxide | 39 | 35 | 22 |  | 32 | 34 | 25 |  | 35 |
| Zinc bloom |  |  |  | 25 |  | 3 | 3 | 30 |  |
| Triphenylboron |  |  | 7 | 6 |  |  |  |  |  |
| Zinc pyrithione | 5 |  | 4 | 6 |  | 3 | 5 | 5 | 5 |
| Copper pyrithione |  | 3 |  |  | 4 |  |  |  |  |
| Rosin |  |  |  |  |  | 10 |  | 4 |  |
| Hydrogenated rosin |  |  |  | 5 |  | 10 |  |  |  |
| Colloidal silica | 2 | 2 | 2 | 2 | 2 | 2 | 2 | 2 | 2 |
| Titanium dioxide |  |  | 2 | 2 |  | 2 |  | 3 |  |
| Cyanine blue |  |  | 3 | 4 |  |  |  | 4 |  |
| Red iron oxide | 4 | 3 |  |  | 4 | 3 | 5 |  | 4 |

TABLE 1-continued

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Chlorinated paraffin |  | 2 |  |  | 2 | 3 |  |  |  |
| Xylene |  |  |  |  |  |  | 20 | 16 | 14 |
|  | 100 | 100 | 100 | 100 | 100 | 100 | 100 | 100 | 100 |
| Specific gravity | 1.4 | 1.2 | 1.2 | 1.2 | 1.3 | 1.3 | 1.4 | 1.3 | 1.4 |
| Amount of solvent | 25 | 27.5 | 30 | 25 | 23 | 20 | 44 | 39 | 38 |
| VOC | 350 | 330 | 360 | 300 | 299 | 260 | 616 | 489 | 532 |
| Viscosity (KU) | 80 | 85 | 85 | 80 | 90 | 90 | 90 | 85 | 90 |

Using the coatings obtained in Examples 1 to 6, the evaluation of coating film condition and long-term antifouling effect was carried out by the following methods.

[Evaluation]

(1) Coating Film Condition

Each of the above coating compositions were coated in a dry thickness of 300 μm on an iron sheet blasted and precoated with a rust-preventive coating and left standing in an interior environment two overnights to dry and give a test sheet. The above test sheet was wrapped around the side wall of a cylinder measuring 750 mm in diameter and 1200 mm long and the cylinder was rotated continuously at a peripheral speed of 15 knots for 6 months. The test sheet after said 6 months was visually inspected to evaluate the coating film condition. As a result, the coating film was found satisfactory, with no evidence of cracks.

(2) Long-term Antifouling Effect

The test sheet examined for coating film condition as above was subjected to life attachment testing on an experimental raft at Nippon Coating's Coastal Research institute for the evaluation of antifouling effect. During a 24-month period following the start of raft submersion, the percentage of attached life relative to the coating film area was 0%, indicating an excellent antifouling effect.

In Examples 1 to 6, high-solid antifouling coatings with VOC values not more than 400 g/L could be obtained and the long-term antifouling effect and coating film condition were invariably satisfactory.

In Comparative Example 1, in which the high Tg value of the acrylic resin caused an increase in viscosity of the metal-containing acrylic resin varnish, a high-solid antifouling coating could not be implemented. In Comparative Example 2, the high average degree of polymerization of the resin caused an increase in viscosity of the metal-containing acrylic resin varnish so that a high-solid antifouling coating could not be implemented. In Comparative Example 3, in which versatic acid, which is amonobasic acid having ahigh acid value, was used, the viscosity of the metal-containing acrylic resin varnish was so high that a high-solid antifouling coating could not be implemented.

PRODUCTION EXAMPLE 12

Production of Acrylic Resin Varnish 12

A 4-necked flask equipped with a stirrer, cooling condenser, temperature control, nitrogen gas inlet pipe and drip funnel was charged with 64 parts of xylene and 16 parts of n-butanol and the temperature was controlled at 100° C. To this solution, a mixture of 7.3 parts of ethyl acrylate, 22.1 parts of 2-ethylhexyl methacrylate, 15 parts of cyclohexyl methacrylate, 30 parts of methoxy methacrylate polyethylene glycol ester (NK ester M-90G, product of Shin Nakamura Chemical Co.), 25.6 parts of acrylic acid and 2 parts of t-butyl peroxy-2-ethylhexanoate was added dropwise at a constant rate over 3 hours. After completion of dropwise addition, the mixture was incubated for 30 minutes. Then, a mixture of 16 parts of xylene, 4 parts of n-butanol and 0.2 part of t-butyl peroxy-2-ethylhexanoate was added dropwise at a constant rate over 30 minutes. After completion of dropwise addition, the mixture was incubated for 1.5 hours. Varnish 12, finally obtained, had a nonvolatile fraction of 50.5 wt. % and a viscosity of 20 poises, with the resin having a number average molecular weight of 7000 [average degree of polymerization 70]. The varnish thus obtained had a solids acid value of 200 mg KOH/g.

PRODUCTION EXAMPLE 13

Production of Acrylic Resin Varnish 13

The same reaction vessel as used in Production Example 12 was charged with 50 parts of xylene and 50 parts of n-butanol, and the temperature was controlled at 115° C. To this solution, a mixture of 58.3 parts of ethyl acrylate, 25 parts of cyclohexyl acrylate, 16.7 parts of acrylic acid and 3 parts of t-butyl peroxy-2-ethylhexanoate was added dropwise at a constant rate over 3 hours. After completion of dropwise addition, the mixture was incubated for 2 hours. The varnish 13 had a nonvolatile fraction of 51.0 wt. % and a viscosity of 3.2 poises, with the resin having a number average molecular weight of 4000 [average degree of polymerization 40]. The solids acid value of the varnish was 130 mg KOH/g.

PRODUCTION EXAMPLE 14

Production of Acrylic Resin Varnish 14

The same reaction vessel as used in Production Example 12 was charged with 40 parts of xylene and 40 parts of n-butanol, and the temperature was controlled at 100° C. To this solution, a mixture of 48.2 parts of ethyl acrylate, 15 parts of 2-ethylhexyl methacrylate, 17.5 parts of NK ester M-90G, 19.3 parts of acrylic acid and 2 parts of t-butyl peroxy-2-ethylhexanoate was added dropwise at a constant rate over at 3 hours. After completion of dropwise addition, the mixture was incubated at 100° C. for 30 minutes. Then, a mixture of 10 parts of xylene, 10 parts of n-butanol and 0.2 part of t-butyl peroxy-2-ethylhexanoate was added dropwise at a constant rate over 30 minutes. After completion of dropwise addition, the mixture was incubated for 1.5 hours.

Varnish 14, thus obtained, had a nonvolatile fraction of 50.0 wt. % and a viscosity of 12 poises, with the resin having a number average molecular weight of 7000 [average degree of polymerization 70]. The solids acid value of the varnish was 150 mg KOH/g.

PRODUCTION EXAMPLE 15

Production of Acrylic Resin Varnish 15

The same reaction vessel as used in Production Example 12 was charged with 64 parts of xylene and 16 parts of n-butanol, and the temperature was controlled at 90° C. To this solution, a mixture of 21.9 parts of ethyl acrylate, 30 parts of isobutyl methacrylate, 22.5 parts of NK ester M-90G, 25.6 parts of acrylic acid and 2 parts of azobisisobutyronitrile was added dropwise at a constant rate over 3 hours. After completion of dropwise addition, the mixture was incubated for 30 minutes. Then, a mixture of 16 parts of xylene, 4 parts of n-butanol and 0.2 part of azobisisobutyronitrile was added dropwise at a constant rate over 30 minutes. After completion of dropwise addition, the mixture was incubated for 2 hours. Varnish 15, thus obtained, had a nonvolatile fraction of 49.8 wt. % and a viscosity of 7.5 poises, with the resin having a number average molecular weight of 8000 [average degree of polymerization 80]. The solids acid value of the varnish was 200 mg KOH/g.

PRODUCTION EXAMPLE 16

Production of Acrylic Resin Varnish 16

The same reaction vessel as used in Production Example 12 was charged with 64 parts of xylene and 16 parts of n-butanol, and the temperature was controlled at 115° C. To this solution, a mixture of 20 parts of methyl methacrylate, 28.3 parts of ethyl acrylate, 25 parts of 2-ethylhexyl methacrylate, 10 parts of NK ester M-90G, 16.7 parts of acrylic acid and 3 parts of t-butyl peroxy-2-ethylhexanoate was added dropwise at a constant rate over 3 hours. After completion of dropwise addition, the mixture was incubated for 30 minutes. Then, a mixture of 16 parts of xylene, 4 parts of n-butanol and 0.2 part of t-butyl peroxy-2-ethylhexanoate was added dropwise at a constant rate over 30 minutes. After completion of dropwise addition, the mixture was incubated for 1.5 hours. Varnish 16, thus obtained, had a nonvolatile fraction of 51.5 wt. % and a viscosity of 6.7 poises, with the resin having a number average molecular weight of 5000 [average degree of polymerization 50]. The solids acid value of the varnish was 130 mg KOH/g.

PRODUCTION EXAMPLE 17

Production of Acrylic Resin Varnish 17

The same reaction vessel as used in Production Example 12 was charged with 64 parts of xylene and 16 parts of n-butanol, and the temperature was controlled at 100° C. To this solution, a mixture of 80.7 parts of ethyl acrylate, 19.3 parts of acrylic acid and 2 parts of azobisisobutyronitrile was added dropwise at a constant rate over 4 hours. After completion of dropwise addition, the mixture was incubated for 30 minutes. Then, a mixture of 16 parts of xylene, 4 parts of n-butanol and 0.2 part of azobisisobutyronitrile was added dropwise at a constant rate over 30 minutes. After completion of dropwise addition, the mixture was incubated for 2 hours. Varnish 17, thus obtained, had a nonvolatile fraction of 50.2 wt. % and a viscosity of 4.5 poises, with the resin having a number average molecular weight of 6000 [average degree of polymerization 60]. The solids acid value of the varnish was 150 mg KOH/g.

PRODUCTION EXAMPLE 18

Production of Metal-containing Acrylic Resin Varnish 18

A 4-necked flask equipped with a stirrer, nitrogen gas inlet pipe, reflux condenser, decanter and temperature control was charged with 100 parts of varnish 12, 37.1 parts of copper acetate, 62.5 parts of WW rosin (acid value 160 mg KOH/g) and 140 parts of xylene. The temperature was increased to the reflux point. With a mixture of acetic acid, water and the solvent being azeotropically removed and a commensurate amount of xylene being supplementally added, the reaction was conducted for 14 hours. The end-point of reaction was determined by assaying acetic acid in the distillate solvent. After cooling, the product was diluted with butanol and xylene to give varnish 18 with a nonvolatile fraction of 36.5 wt. %.

PRODUCTION EXAMPLE 19

Preparation of Metal-containing Acrylic Resin Varnish 19

The same reaction vessel as used in Production Example 18 was charged with 100 parts of varnish 13, 25.4 parts of zinc acetate and 40.6 parts of hydrogenated rosin (acid value 160 mg KOH/g) and the reaction was carried out in otherwise the same manner as in Example 18 to give varnish 19 with a nonvolatile fraction of 50.4 wt. %.

PRODUCTION EXAMPLE 20

Preparation of Metal-containing Acrylic Resin Varnish 20

The same reaction vessel as used in Production Example 18 was charged with 100 parts of varnish 14, 27.8 parts of copper acetate and 46.9 parts of disproportionated rosin (acid value 160 mg KOH/g) and the reaction was carried out in otherwise the same manner as in Example 18 to give varnish 20 with a nonvolatile fraction of 36.8%.

PRODUCTION EXAMPLE 21

Preparation of Metal-containing Acrylic Resin Varnish 21

The same reaction vessel as used in Production Example 18 was charged with 100 parts of varnish 15, 39.1 parts of zinc acetate and 53.5 parts of abietic acid (acid value 160 mg KOH/g) and the reaction was carried out in otherwise the same manner as in Example 18 to give varnish 21 with a nonvolatile fraction of 37.7 wt. %.

PRODUCTION EXAMPLE 22

Preparation of Metal-containing Acrylic Resin Varnish 22

The same reaction vessel as used in Production Example 18 was charged with 100 parts of varnish 16, 24.1 parts of copper acetate and 40.6 parts of disproportionated rosin (acid value 160 mg KOH/g) and the reaction was carried out in otherwise the same manner as in Example 18 to give varnish 22 with a nonvolatile fraction of 44.4 wt. %.

PRODUCTION EXAMPLE 23

Preparation of Metal-containing Acrylic Resin Varnish 23

The same reaction vessel as used in Production Example 18 was charged with 100 parts of varnish 17, 27.8 parts of copper acetate and 46.9 parts of hydrogenated rosin (acid value 160 mg KOH/g) and the reaction was carried out in otherwise the same manner as in Example 18 to give varnish 23 with a nonvolatile fraction of 52.6 wt. %.

PRODUCTION EXAMPLE 24

Preparation of Metal-containing Acrylic Resin Varnish 24

The same reaction vessel as used in Production Example 18 was charged with 100 parts of varnish 12, 37.1 parts of copper acetate and 62.5 parts of hydrogenated rosin (acid value 160 mg KOH/g) and the reaction was carried out in otherwise the same manner as in Example 18 to give varnish 24 with a nonvolatile fraction of 40.2 wt. %.

PRODUCTION EXAMPLE 25

Preparation of Metal-containing Acrylic Resin Varnish 25

The same reaction vessel as used in Production Example 18 was charged with 100 parts of varnish 14, 27.8 parts of copper acetate and 45.5 parts of naphthenic acid (NA-165, acid value 160 mg KOH/g, Daiwa Yushi Kogyo) and the reaction was carried out in otherwise the same manner as in Example 18 to give varnish 25 with a nonvolatile fraction of 35.0 wt. %.

PRODUCTION EXAMPLE 26

Preparation of Metal-containing Acrylic Resin Varnish 26

The same reaction vessel as used in Production Example 18 was charged with 100 parts of varnish 12, 37.1 parts of copper acetate and 30.3 parts of versatic acid and the reaction was carried out in otherwise the same manner as in Example 18 to give varnish 26 with a nonvolatile fraction of 34.7 wt. %.

PRODUCTION EXAMPLE 27

Preparation of Metal-containing Acrylic Resin Varnish 27

The same reaction vessel as used in Production Example 18 was charged with 100 parts of varnish 13, 25.4 parts of zinc acetate and 32.5 parts of naphthenic acid (NA-200, acid value 200 mg KOH/g, Daiwa Yushi Kogyo) and the reaction was carried out in otherwise the same manner as in Example 18 to give varnish 27 with a nonvolatile fraction of 42.1%.

PRODUCTION EXAMPLE 28

Preparation of Metal-containing Acrylic Resin Varnish 28

The same reaction vessel as used in Production Example 18 was charged with 100 parts of varnish 15, 39.1 parts of zinc acetate and 50.3 parts of oleinic acid and the reaction was carried out in otherwise the same manner as in Example 18 to give varnish 28 with a nonvolatile fraction of 39.0 wt. %.

PRODUCTION EXAMPLE 29

Preparation of Metal-containing Acrylic Resin Varnish 29

The same reaction vessel as used in Production Example 18 was charged with 100 parts of varnish 16, 24.1 parts of copper acetate and 19.7 parts of versatic acid and the reaction was carried out in otherwise the same manner as in Example 18 to give varnish 29 with a nonvolatile fraction of 39.8 wt. %.

EXAMPLES 7 TO 24 AND COMPARATIVE EXAMPLES 4 TO 7

The varnishes 18 to 29 obtained in Production Examples 18 to 29 and the other components mentioned in Table 2 were admixed by means of High-speed Disper to prepare coating compositions and the respective coatings were evaluated for long-term antifouling performance and coating film condition by the evaluation methods described hereinbefore. The results of evaluations are set forth in Table 3. The number of months in Table 3 indicates the raft immersion time and each figure denotes the percentage of foul area based on the total coating film area.

The antifoulants mentioned in Table 2 are the following compounds.

Antifoulant 1: Zinc dimethyldithiocarbamate
Antifoulant 2: Manganese ethylenebisdithiocarbamate
Antifoulant 3: 2-Methylthio-4-t-butylamino-6-cyclopropylamino-s-triazine
Antifoulant 4: 2,4,5,6-tetrachloroisophthalonitrile
Antifoulant 5: N,N-dimethyldichlorophenylurea
Antifoulant 6: 4,5-Dichloro-2-n-octyl-3(2H)-isothiazolone
Antifoulant 7: N-(fluorodichloromethylthio)-phthalimide
Antifoulant 8: N,N'-dimethyl-N'-phenyl-(N-fluorodichloromethylthio)sulfamide
Antifoulant 9: 2,4,6-Trichlorophenylmaleimide
Antifoulant 10: 2,3,5,6-Tetrachloro-4-(methylsulfonyl)pyridine
Antifoulant 11: 3-Iodo-2-propenylbutyl carbamate
Antifoulant 12: Diiodomethyl-p-tolylsulfone
Antifoulant 13: Dimethyldithiocarbamoylzinc ethylenebisdithiocarbamate
Antifoulant 14: Phenyl(bispyridine)bismuth dichloride
Antifoulant 15: 2-(4-Thiazolyl)benzimidazole
Antifoulant 16: Pyridine-triphenylborane
Antifoulant 17: Zinc ethylenebisdithiocarbamate
Antifoulant 18: Stearylamine-triphenylboron
Antifoulant 19: Laurylamine-triphenylboron

TABLE 2

| Unit:weight parts | Example | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 |
| Varnish 18 | 40 | 45 | | | | | | | | | | |
| Varnish 19 | | | 45 | 40 | 40 | | | | | | | |
| Varnish 20 | | | | | | 45 | | | | | | |
| Varnish 21 | | | | | | | 40 | 45 | | | | |
| Varnish 22 | | | | | | | | | 35 | | | |
| Varnish 23 | | | | | | | | | | 30 | | |
| Varnish 24 | | | | | | | | | | | 40 | |
| Varnish 25 | | | | | | | | | | | | 45 |

TABLE 2-continued

| | | | | | | | | | | | | |
|---|---|---|---|---|---|---|---|---|---|---|---|---|
| Varnish 26 | | | | | | | | | | | | |
| Varnish 27 | | | | | | | | | | | | |
| Varnish 28 | | | | | | | | | | | | |
| Varnish 29 | | | | | | | | | | | | |
| Copper suboxide | 30 | 25 | 25 | 10 | | 15 | | 30 | | 25 | 30 | |
| Copper rhodanide | | | | 20 | | 30 | 15 | 20 | | 20 | | |
| Zinc bloom | 5 | | 5 | | 15 | | 5 | | 5 | | | 2 |
| Titanium dioxide | 1 | | | | 3 | 2 | | 3 | | 3 | | 2 |
| Phthalocyanine blue | | | | | 3 | 2 | | 3 | | 3 | | |
| Talc | | 2 | 2 | | 3 | | | | | | 3 | |
| Red iron oxide | 2 | 2 | 2 | 3 | | | 2 | | 3 | | 3 | 3 |
| Pyrithione zinc | 2 | | | | 5 | 3 | | 6 | | | | |
| Pyrithione copper | | 3 | 3 | | | | | | | 5 | 6 | |
| Tetramethylthiuram disulfide | | | | | | 2 | | | | | | |
| Antifoulant 1 | 2 | | | | 3 | | 4 | | | | | |
| Antifoulant 2 | | 2 | | | | | | | | | | |
| Antifoulant 3 | | | | 4 | | | | | | | | |
| Antifoulant 4 | | | | 2 | | | | | | | | |
| Antifoulant 5 | | | 2 | | | | | | | | | |
| Antifoulant 6 | | 2 | | | | | | | 5 | | 3 | |
| Antifoulant 7 | | | | | | 4 | | | | | | |
| Antifoulant 8 | | | 2 | | | | | | | | | |
| Antifoulant 9 | | | | | | | | 5 | | | | |
| Antifoulant 10 | | 2 | | | | | | | | | | |
| Antifoulant 11 | | | | | | | 3 | | | | | |
| Antifoulant 12 | | | | | | | | | | | 3 | |
| Antifoulant 13 | | | | | | | | | | 3 | | |
| Antifoulant 14 | | | | | | | | | | | | 2 |
| Antifoulant 15 | | | 3 | | | | | | | 2 | | |
| Antifoulant 16 | | 1 | | | 5 | 3 | | 5 | | | | |
| Antifoulant 17 | | | | | | | | | | | | |
| Antifoulant 18 | | | 2 | | | | | | | 3 | | |
| Antifoulant 19 | | | | | | | | | | | | |
| Polyvinyl ethyl ether | | 2 | 3 | 3 | | | | 5 | 2 | 3 | 3 | |
| Chlorinated paraffin | 2 | | | 4 | | 4 | | | 2 | 3 | 4 | |
| Dibutyl phthalate | | 2 | | | | 2 | | | | | | |
| Gum rosin | | 5 | | | | 5 | | | | | | 8 |
| Tall oil rosin | | | | | 10 | | | | | | | |
| Wood rosin | | | | | | 4 | | | | | | |
| Hydrogenated gum rosin | | | | | | | | | | 20 | | |
| Disproportionated rosin | | | 7 | | | | | | | | | |
| Hydrogenated tall oil rosin | | | | | | | | | 11 | | | |
| Hydrogenated wood rosin | | | | | | | | | | | | |
| Rosin ester | | | 2 | | | | | | | | | |
| Copper naphthenate | | | | | | | | | | | | |
| Gum rosin zinc | | | | | | | | | | | | |
| Hydrogenated tall oil zinc | | | | | | | | | | | | |
| Acrylic resin* | 10 | | | | | | | | | | | |
| Antisagging agent** | 2 | 2 | 2 | 3 | 2 | 2 | 3 | 2 | 2 | 3 | 3 | 2 |
| Methyl isobutyl ketone | 2 | 2 | 2 | 3 | 3 | 2 | 3 | 3 | 2 | 2 | 3 | 3 |
| Xylene | | 3 | | 5 | | | | 3 | | 3 | 4 | |
| Butyl cellosolve | 2 | | | | 4 | | | | | | | 3 |
| Total | 100 | 100 | 100 | 100 | 100 | 100 | 100 | 100 | 100 | 100 | 100 | 100 |

| | Example | | | | | | Compar. Ex. | | | |
|---|---|---|---|---|---|---|---|---|---|---|
| Unit:weight parts | 19 | 20 | 21 | 22 | 23 | 24 | 4 | 5 | 6 | 7 |
| Varnish 18 | 25 | | 35 | | | | | | | |
| Varnish 19 | | 20 | | 25 | | | | | | |
| Varnish 20 | | | | | 30 | | | | | |
| Varnish 21 | | | | | | 35 | | | | |
| Varnish 22 | | | | | | | | | | |
| Varnish 23 | | | | | | | | | | |
| Varnish 24 | | | | | | | | | | |
| Varnish 25 | | | | | | | | | | |
| Varnish 26 | | 20 | | | | | 40 | | | |
| Varnish 27 | | | 15 | | | | | 40 | | |
| Varnish 28 | | | | | | | | | 40 | |
| Varnish 29 | | | | | | | | | | 40 |
| Copper suboxide | | | | 30 | 20 | 30 | | 15 | 25 | 25 |

TABLE 2-continued

| Component | 1 | 2 | 3 | 4 | 5 | 6 | 7 | 8 | 9 | 10 |
|---|---|---|---|---|---|---|---|---|---|---|
| Copper rhodanide | | | | | 30 | 20 | | 15 | | |
| Zinc bloom | 10 | 5 | 5 | 5 | | | 10 | | 7 | 5 |
| Titanium dioxide | 1 | | | | 3 | 3 | | 2 | | |
| Phthalocyanine blue | 3 | | | | 3 | 3 | | 2 | | |
| Talc | | 2 | | | | | 3 | 2 | 3 | 3 |
| Red iron oxide | | 2 | 2 | 3 | | | 3 | | 3 | 3 |
| Pyrithione zinc | 5 | | 3 | | | | | | | |
| Pyrithione copper | | 3 | | | | | | | | |
| Tetramethylthiuram disulfide | | | | | | | | | | |
| Antifoulant 1 | | | | | | | | 3 | | |
| Antifoulant 2 | | | | | 2 | | | | | |
| Antifoulant 3 | | | | | | | | | | 2 |
| Antifoulant 4 | | | | | 4 | | | | | 2 |
| Antifoulant 5 | | | | | | | 5 | | | |
| Antifoulant 6 | 5 | | | | | | | | | |
| Antifoulant 7 | | | | | | 3 | | | 3 | |
| Antifoulant 8 | | | | | | | | 2 | | |
| Antifoulant 9 | | | | | | | | | 2 | |
| Antifoulant 10 | | | | | | 2 | | | | |
| Antifoulant 11 | | | | | 2 | | | | | |
| Antifoulant 12 | | | | | | 3 | | | | |
| Antifoulant 13 | | | | 3 | | | | | | |
| Antifoulant 14 | | | | | | | 2 | | | |
| Antifoulant 15 | | | 2 | 2 | | | | | | |
| Antifoulant 16 | 2 | | | | | | | | | |
| Antifoulant 17 | | | | 4 | | 4 | | | | |
| Antifoulant 18 | | | | | 3 | | | | | |
| Antifoulant 19 | | | | 3 | | | | | | |
| Polyvinyl ethyl ether | 5 | 3 | | | 5 | | 5 | 5 | | 5 |
| Chlorinated paraffin | | | 4 | | | | 4 | 4 | 3 | |
| Dibutyl phthalate | | | | 3 | | | | | 3 | |
| Gum rosin | | 8 | | | | | 15 | 10 | | |
| Tall oil rosin | | | | | | | | | | |
| Wood rosin | | | 6 | | | | | | | |
| Hydrogenated gum rosin | | | | 7 | | 5 | | | | |
| Disproportionated rosin | | | | | | 5 | | | | |
| Hydrogenated tall oil rosin | | | | | | | | | | |
| Hydrogenated wood rosin | 15 | | | | | | | | | |
| Rosin ester | | 2 | | | 2 | | | | | |
| Copper naphthenate | | | 3 | | | 5 | | | | |
| Gum rosin zinc | | | 5 | | | | | | | |
| Hydrogenated tall oil zinc | | | | 10 | | | | | | |
| Acrylic resin* | | | 6 | | | 5 | | | | |
| Antisagging agent** | 3 | 2 | 3 | 2 | 2 | 3 | 2 | 2 | 3 | 3 |
| Methyl isobutyl ketone | 3 | 3 | 4 | 2 | 3 | 3 | 1 | 3 | 3 | 2 |
| Xylene | 3 | 3 | 5 | 5 | 3 | 6 | | 5 | | 10 |
| Butyl cellosolve | | | | 3 | | | | | | |
| Total | 100 | 100 | 100 | 100 | 100 | 100 | 100 | 100 | 100 | 100 |

*Paraloid B-66, product of Rohm & Haas Co.
**Disparlon A630-20X, product of Kusumoto Kasei K. K.

TABLE 3

| | Example | | | | | | | | | | | | | | | | | | Compar. Ex. | | | |
|---|---|---|---|---|---|---|---|---|---|---|---|---|---|---|---|---|---|---|---|---|---|---|
| | 7 | 8 | 9 | 10 | 11 | 12 | 13 | 14 | 15 | 16 | 17 | 18 | 19 | 20 | 21 | 22 | 23 | 24 | 4 | 5 | 6 | 7 |
| Long-term antifouling effect | | | | | | | | | | | | | | | | | | | | | | |
| 6 months | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 months | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 months | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 22 months | 0 | 0 | 0 | 0 | 0 | 0 | 0 | 0 | 0 | 0 | 0 | 5 | 0 | 0 | 0 | 0 | 0 | 0 | 15 | 10 | 5 | 20 |
| 24 months | 0 | 0 | 0 | 0 | 0 | 0 | 0 | 0 | 0 | 0 | 0 | 10 | 5 | 5 | 0 | 0 | 0 | 0 | 50 | 50 | 50 | 60 |
| Coating film condition | Normal | | | | | | | | | | | | | | | | | | Cracked | normal | Cracked | Slightly cracked |

The coatings according to Examples 7 to 24 were excellent in long-term antifouling performance and coating film condition. In the coatings according to Comparative Examples 4~7, no reconciliation was made between coating film condition and long-term antifouling performance.

The invention claimed is:

1. An antifouling coating which comprises a metal-containing acrylic resin having, in a side chain thereof, at least one group represented by the following formula (1):

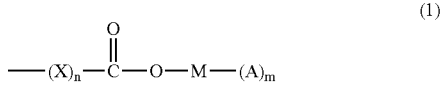

(1)

wherein X represents a group of the formula:

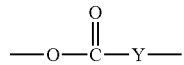

n represents 0 or 1; Y represents a hydrocarbon group; M represents a metal; m represents an integer equal to the valence number of metal M-1; A represents an organic acid residue derived from a monobasic acid,
with 5 to 100 mole % of said organic acid residue derived from a monobasic acid being the residue of a cyclic organic acid,
wherein the monobasic acid has a diterpenoid hydrocarbon skeleton or a salt thereof, and wherein the monobasic acid is selected from the group consisting of rosins, hydrogenated rosins and disproportionated rosins.

2. The antifouling coating according to claim 1, wherein the cyclic organic acid has an acid value of 120 to 190 mg KOH/g.

3. The antifouling coating according to claim 1 wherein the metal M is copper or zinc.

4. The antifouling coating according to claim 1 wherein the ratio of the monobasic acid to the acrylic resin constituting the metal-containing acrylic resin is 0.9/1.1 to 1.2/0.8 by weight on a nonvolatile matter basis.

5. The antifouling coating according to claim 1, comprising an additional binder resin in a weight ratio, on a nonvolatile basis, of (metal-containing acrylic resin)/(additional binder resin)=100/0 to 30/70.

6. The antifouling coating according to claim 1, wherein the acrylic resin constituting said metal-containing acrylic resin has an acid value of 80 to 300 mg KOH/g and a glass transition temperature of not higher than 5° C.

7. The antifouling coating according to claim 1, wherein the monobasic acid has an acid value of less than 200 mg KOH/g.

8. The antifouling coating according to claim 2, wherein the monobasic acid has an acid value of less than 200 mg KOH/g.

* * * * *